United States Patent [19]

Sim

[11] Patent Number: 4,932,393
[45] Date of Patent: Jun. 12, 1990

[54] GAS HEATED TOOL WITH CONTROL VALVE AND REFILLABLE CONTAINER

[76] Inventor: Nigel L. Sim, 10 Conniston Road, Southampton, England

[21] Appl. No.: 312,806
[22] PCT Filed: Jun. 9, 1987
[86] PCT No.: PCT/GB87/00397
  § 371 Date: Feb. 9, 1989
  § 102(e) Date: Feb. 9, 1989
[87] PCT Pub. No.: WO87/07549
  PCT Pub. Date: Dec. 17, 1987

[30] Foreign Application Priority Data

Jun. 9, 1986 [GB] United Kingdom ............... 8613930
May 21, 1987 [GB] United Kingdom ............... 8712039

[51] Int. Cl.$^5$ ............................................. B23K 3/02
[52] U.S. Cl. ........................... 126/413; 137/505.25; 137/498; 431/344; 431/89; 431/354; 141/349
[58] Field of Search .................. 431/344, 89, 90, 354, 431/355; 126/233, 403, 406, 408, 409, 413, 414; 137/505.25, 498; 141/18, 346, 348, 349

[56] References Cited

U.S. PATENT DOCUMENTS

| | | | |
|---|---|---|---|
| 1,281,300 | 10/1918 | Cross | 431/354 |
| 1,548,447 | 8/1925 | Dice . | |
| 1,768,147 | 6/1930 | Raymond . | |
| 3,299,940 | 1/1967 | Phillips et al. | 431/90 |
| 3,642,422 | 2/1972 | Schafer | 431/344 |
| 3,941,554 | 3/1976 | Curtis | 431/89 |
| 4,793,798 | 12/1988 | Sabin | 431/9 |

FOREIGN PATENT DOCUMENTS 2536181 2/1976 Fed. Rep. of Germany .
418170 10/1934 United Kingdom .
1049552 11/1966 United Kingdom .

*Primary Examiner*—Carroll B. Dority
*Attorney, Agent, or Firm*—Bacon & Thomas

[57] ABSTRACT

A gas heated tool such as a soldering iron has a refillable gas container (1) with an inlet valve (17, 18, 19) and an outlet valve (14) biassed mutually to the closed position by a spring (21) acting between them. The outer valve is opened by an operating member (31) which is connected to a diaphragm (30) forming part of a differential valve. This is controlled by a rotatable tube (39) with pins (43) engaging a profile on an axially movable cam member (38) which acts on the operating member (31) through a spring (37). The control tube (39) has its upper end apertured (57) to control the admission of air in accordance with its angle of rotation. Thus, the rotation of tube (39) simultaneously adjusts the differential valve to control the flow of gas from container (1), and adjusts the mixture by adjusting the air admitted. Gas passing up operating member (31) mixes with the air and is consumed in combustion head (4).

28 Claims, 5 Drawing Sheets

GAS HEATED TOOL WITH CONTROL VALVE AND REFILLABLE CONTAINER

BACKGROUND OF THE INVENTION

This specification relates chiefly to gas heated tools and the like and particularly but by no means exclusively to portable gas operated tools and appliances such as, for example, soldering irons, glue guns, hair curling tongs and so forth.

The disclosure is particularly concerned with aspects of safety, stability of output, efficiency and ease of operation of the tools.

In GB-A-1524185 there is disclosed a gas-fired soldering iron in which gas is supplied from a cylinder to a jet via a regulating valve which is used to control the rate of flow, the gas issuing from the jet is mixed with air and the gas/air chamber which is enclosed by a gauze, for example.

SUMMARY OF THE INVENTION

It has now been found that improved performance of such apparatus can be achieved by providing not only a variable gas flow but also by providing a variable gas-/air ratio in accordance with the rate of flow. This enables the correct gas/air ratio to be used in dependence on operating conditions, for example during ignition, or at a gas flow chosen for a particular operating temperature, or where the apparatus is to be used in windy conditions or the like.

Thus, viewed from one broad aspect there is disclosed herein a gas heated tool comprising a mixture supplying conduit for feeding gas/air mixture to an enclosed combustion chamber having means for allowing the exit of exhaust gas, a jet for introducing pressurised fuel gas into the conduit, control means for adjusting the flow of gas into the conduit to a desired level, and air admission means through which air can be drawn into the COnduit, the air admission means being adjustable so as to vary the air/gas ratio of the mixture supplied to the combustion chamber, wherein the control means for adjusting the flow of gas into the conduit is operative simultaneously to determine the degree of adjustment of the air admission means.

By so arranging the control means, the relationship between the gas flow and the gas/air ratio can be chosen to cope with varying conditions. In general the relationship will be non-linear. For example, an increase in gas flow from zero to maximum may be accompanied initially by no change in the air/gas ratio, followed by a reduction so that there is a richer mixture at maximum flow. There may be specific adjustment positions, such as a less than maximum flow with a richer mixture than for normal maximum output, for use in high wind conditions, and a lower flow rate with an even richer mixture for use in start-up. The versatility of the control means is preferably such that the same rates of flow can be associated with different mixture strengths for use in accordance with the running conditions.

Thus in a gas heated soldering iron, for example, the burner which heats the soldering tip operates on the Bunsen burner principle in which air is mixed with gas at a position spaced from the combustion position but, instead of the gas regulating means and air regulating means being separate and separately operated, they are combined and operated by a single control. Since the gas and air are mixed prior to combustion the flame can burn in a confined space within a head of the tool, such confined space being, for example, 0.35 cc for an iron equivalent to a 60 watt electric iron.

The supply of correct air gas mixures is essential for stability, clean combustion, operation in high winds, temperature adjustment, linear combustion and safety. Pressure regulation is also important.

The iron preferably runs in an over aerated state. Since it cannot be started in this condition the mixture is richened for starting but backed off after starting since as the iron heats up the density of the gas falls. A richer setting is available for high wind or other unstable conditions.

In a preferred arrangement, the air admission means includes a rotatable member which is rotated to adjust the available flow cross-section for air. The rotatable member could be in the form of a cover movable over an aperture, but is preferably provided with one or more air inlet apertures and is movable with respect to one or more fixed shields. By suitably shaping an aperture and/or providing a number of apertures of different size, the correct mixture can be obtained for a particular rotational position. In a preferred arrangement, the rotatable member is associated with a cam for controlling the gas flow valve, whose profile is such as to establish the required relationship between flow rate and mixture. This provides a convenient way of allowing for a non-linear relationship and, if desired, specific positions for start-up, high wind operation and so forth. Thus, whilst rotation of the member in a particular direction may cause the air inlet flow cross-section to increase progressively, the cam profile can vary to increase the gas flow or to decrease it at any chosen position. The air inlet flow cross-section opening could have a non-linear relationship to the degree of rotation, e.g. by shaping air inlet apertures suitably as mentioned above, and may itself increase or decrease.

In a preferred embodiment, a cam follower rotates with rotation of the control member, and the cam is in the form of an annular or part annular body which can move axially but is restrained against rotation. An axially facing end of the cam provides a cam surface around which the follower moves, and has e.g. ramps, steps, notches etc to determine the axial position of the cam in accordance with the angle of rotation of the follower. The axial position of the cam is used to determine the extent of opening of a valve to control the rate of flow of gas from a suitable source such as a refillable gas container.

The rotatable control member could be in the form of a tube, provided with means for manual rotation to a selected position. The cam is preferably disposed coaxially around the tube, which preferably has a radial projection forming the cam follower. By providing two cam followers and two matching cam surfaces on the cam, at 180° to each other, the construction can be kept in balance.

It will be appreciated that the cam surface could, as an alternative be rotatable and associated with the rotatable control member so that a follower moves axially to determine the extent of opening of the gas valve. Thus, viewed broadly the preferred operation is provided by a rotatable control member, connected to a gas valve operating member by a cam and cam follower arangement which determines the axial position of the gas valve operating member in accordance with the angular position of the control member. In the preferred arrangement, the operating member for the gas valve will move in the direction of the rotational axis of the control member.

The gas valve operating member might, in certain circumstances, be part of a simple valve, for example acting on a closure member for a gas container, which is biassed by e.g. a spring to the closed position. However, it is much preferred that a differential valve be provided to ensure accurate control over the gas flow. In a preferred arrangement, the gas valve operating member is connected to a diaphragm which forms one wall of a chamber, from which there is an outlet for gas. The outlet may conveniently be in the form of a bore through the operating member itself. The operating member contacts a member for opening a gas container valve by axial movement, to allow gas into the chamber. The gas container valve is biassed to the closed position by e.g. a spring inside the container. Axial movement of the cam in the preferred arrangement (or the follower in the alternative mentioned above) is transmitted to the operating member and diaphragm by means of a spring. The arrangement is such that gas pressure in the chamber acts on the diaphragm to urge the operating member in the direction for closing the gas conainer valve. Thus for any setting of the control member, which determines the axial position of the cam in the preferred arrangement, the gas flow will be regulated. If the gas flow increases above its required level, the diaphragm will move to close the valve. There is a balance between the valve closing spring, the gas pressure on the diaphragm, and the spring acting on the diaphragm and operating member.

In the preferred arrangement, a safety feature is provided in case the regulator fails to work. This could happen at low temperatures where e.g. butane gas tends to liquefy. In addition, a torn or leaking diaphragm would also cause problems. Under such circumstances the balance of forces would change, and with the lack of force from the diaphragm the valve operating member would move in the opening direction, with potantially dangerous results. To overcome this a safety valve member is provided which seals the flow of gas if there is excessive movement of the operating member in the opening direction.

In a preferred arrangement, the gas container valve includes a member with an aperture, for gas flow, on both sides of which is a valve seat. The seat facing the container cooperates with a container sealing member biassed by a spring. A member for opening the container valve passes through the aperture, and on the other side, a suitable axial distance from the valve seat on that side, is a safety sealing member to cooperate with the seat. Initial movement in an axial direction towards the container opens the aperture, by moving the container sealing member against its spring and away from its seat. Further movement brings the safety sealing member into sealing contact with its seat, thus closing the aperture.

It will be appreciated that both the gas valve and air valve control means described above, and the particular differential valve, could be used in other contexts whether together or separately, where gas is used. They are not limited to use in gas heated tools.

As regards safety, there is disclosed herein a further feature for use with a refillable gas container, in which means are provided for refilling the container whilst installed on apparatus such as a soldering iron or other apparatus above described, and in which the supply of gas from the cylinder for combustion purposes is cut-off in case a control has inadvertently been left in an "on" condition. This system may be used with other apparatus as described herein or with any form of apparatus in which gas is to be supplied from a refillable container.

Thus, there is disclosed broadly herein a refillable gas container having an outlet valve at one end thereof biassed to a closed position, a gas inlet valve at the other end thereof opposite the outlet valve, for refilling purposes, and also biassed to a closed position, and a spring acting between the gas inlet and gas outlet valves to provide the biassing forces. There is preferably provided a two part axial member between the valves, with the spring acting between the two parts. The parts may be telescopically engaged with each other.

With such an arrangement, when the inlet valve is moved from its closed position, a force will be transmitted to the outlet valve, providing an additional closing force. If this force is greater than the opening force which is provided through a spring by an control for burner apparatus which is accidentally left in the on position, then the outlet valve will be closed to shut off the gas supply. This closure of the outlet valve should occur before any gas is supplied into the container by a filler, and this is achieved by ensuring that the force required to open a valve in the filler is (preferably much) greater than the force of the control mechanism trying to keep the valve open, for example 2 kg as against 200 g. Whilst to some extent the success of the arrangement depends on the nature of the filler and the nature of the control mechanism of apparatus with which the gas container is to be used, the construction of the container does adapt it for use in an advantageous arrangement as mentioned above.

The above-described gas burner apparatus, gas container and other arrangements are of use in a number of contexts including soldering irons. It is also proposed that the apparatus be used in a glue gun in which e.g. a thermoplastic glue is passed through a heated head and discharged from a nozzle. For use in such a system there is also disclosed herein a gas heated head, which broadly consists of means defining a passage through which material to be heated is passed, and a combustion chamber connected to the exterior of the of the passage defining means and in heat conducting relationship therewith, the combustion chamber being in the form of a labyrinth into which a gas/air mixture is passed for combustion, and the exhaust gases pass through series of baffles in the labyrinth before passing to the exterior. Thus, the baffles and other portions of the combustion chamber, and preferably also a wall of the passage defining means, act as a heat absorbers to absorb the heat of the flame and the exhaust gases and transfer it to the remainder of the passage defining means and any material therein. The passage defining means and the combustion chamber may be formed in a single block of metal.

BRIEF DESCRIPTION OF THE DRAWINGS

Some embodiments exemplifying the above and other broad concepts will now be described by way of example and with reference to the accompanying schematic drawings, in which.

DESCRIPTION OF THE PREFERRED EMBODIMENT

Figure 1:
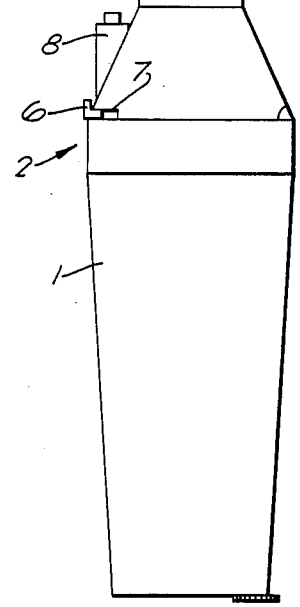
FIG. 1 is a general view of a gas heated soldering iron.

The soldering iron of FIG. 1 includes a gas container 1, a control unit indicated generally at 2, an outer casing 3, a combustion head 4 and a soldering bit 5. The control unit includes a thumb operated lever 6 movable around a circumferentially extending slot 7, and a piezo electric ignition unit 8. The combustion head 4 includes a chamber with gas outlets 9.

Figure 2:
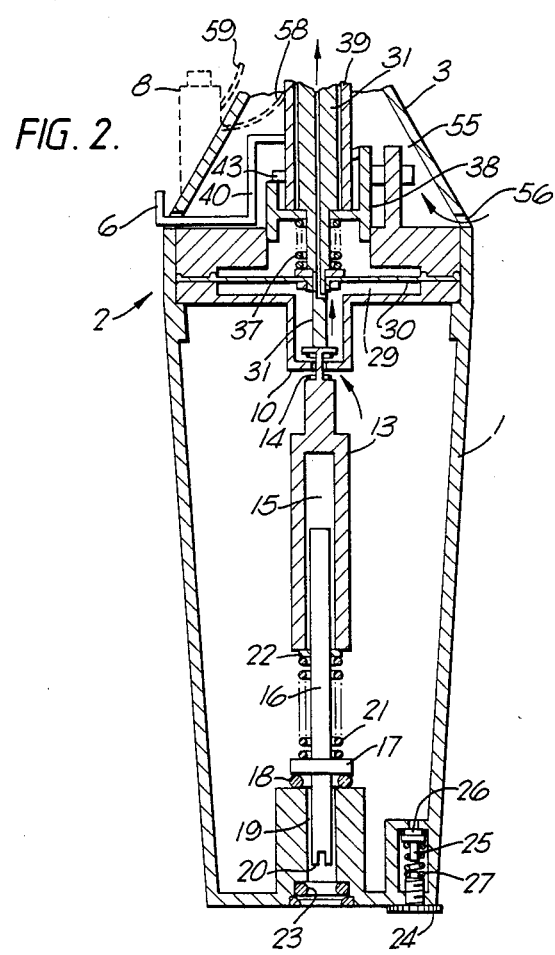
FIG. 2 is a section through part of the soldering iron showing the gas control valve and gas container.
Figure 3:
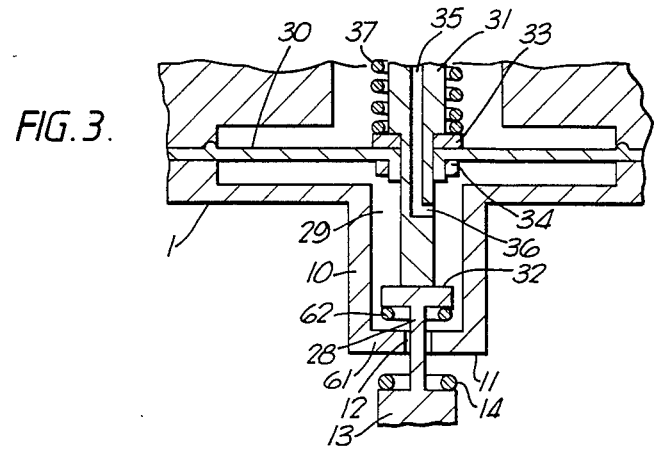
FIG. 3 is an enlarged view of part of the control valve.

As shown in FIGS. 2 and 3 the gas container 1 for e.g. butane is refillable. At its upper end it has an outlet valve. This comprises an apertured member 10, an inner valve seat 11 being defined around the aperture 12. A stem 13 within the container 1 has its upper end provided with a seal 14 which is adapted to form a seal on the valve seat 11 to seal the aperture 12 and prevent the flow of gas out of the container. Telescopically engaged within a cavity 15 in the stem 13 is a rod 16. At its lower end, rod 16 is provided with a flange 17. This engages a seal 18 surrounding a refilling opening 19 in the base of the container 1, through which an extension 20 of the rod extends. Acting between flange 17 and the stem 13 is a coil spring 21, this being via a washer 22 slideable on the rod 16. The spring thus urges stem 13 and rod 15 apart, so that the natural bias is for the valves at both ends to be closed, i.e. aperture 12 to be sealed by seal 14 and the end of stem 13, and aperture 19 to be be sealed by seal 18 and flange 17.

Refilling of the gas container 1 is achieved by inserting the nozzle of a gas cylinder through a seal 23 into the aperture 19. This pushes on the portion 20 of rod 16, against the action of spring 21 to open the refilling valve and permit the gas to flow from the cylinder to the container 1.

In hot ambient conditions difficulty may be experienced in transfering liquid gases from one container to another, due to the presure build up in the container being filled, especially if both containers are at the same temperature and consequently the same pressure. To fill the container 1 an edge screw 24 is unscrewed releasing the pressure from a spring loaded valve plunger 25 preferably of plastics and a seat 26. This enables the container to be filled quickly, the speed being regulatable by the adjustment of the edge screw 24. The container 1 is full when fuel is emitted from under the edge of screw 24. It is desirable that the amount of emitted fuel be as small as possible for safety and fuel economy reasons. The edge screw can be adjusted to suit the variations in ambient temperature i.e. cold winter conditions and hot summer conditions. This valve 25,26 doubles as a safety pressure valve. With the edge screw closing the valve via spring 27, the spring 27 is not effectively bottomed. Excessive pressure, hydraulic or gas, can escape by lifting the seat 26. Hydraulic pressure is caused by overfilling in a cold ambient temperature. The temperature of the liquid fuel falls temporarily after filling but the liquid fuel expands on warming up to ambient, causing high hydraulic forces. High gas pressure can be caused by exposing the tank 2 to high temperatures above the recommended safety limits, typically 54° C. Slow seepage will occur from the safety valve, reducing the pressure and hazard of bursting.

When filling the container 1, the soldering iron is held with its tip 5 pointing downwards and with the safety valve open. Generally the fuel is either butane or propane and since these gases are heavier than air they have a tendency to flow down the surface of the iron, and could create a fire hazard if combustion were taking place while the iron was being filled, i.e. topped up. The system is so arranged that when the filler nozzle is inserted into the aperture 19 and pressure is applied to the end portion 20 of rod 10 the gas supply to the combustion space is switched off, thus preventing a potentially dangerous situation. This is achieved since movement of rod 16 acts on the stem 13 via spring 21, to close the outlet valve from the container 1 against any force keeping it open.

Turning now to the system for controlling the outlet valve of the gas container 1, as shown in FIGS. 2 and 3 the stem 13 has an extension 28 which passes through aperture 12 into a chamber 29. One wall of this chamber is defined by a flexible diaphragm 30. Through an apertured central skirt of this diaphragm passes an operating member 31 whose end engages a head 32 on the extension 28. The operating member 31 has a flange 33 secured to it on one side of the diaphragm, there being a locating washer 34 on the other side. The operating member is provided with a central bore 35 opening at 36 into the chamber 29, this bore supplying gas to the combustion head 4 of the iron as described in more detail below.

A coil spring 37 acts between the flange 33 and the base of an axially movable cam member 38. The cam member is disposed around a control tube 39 which in turn is disposed about the operating member 31. The control tube 39 is rotatable by means of an arm 40 connected to the thumb operated lever 6.

Figure 4:
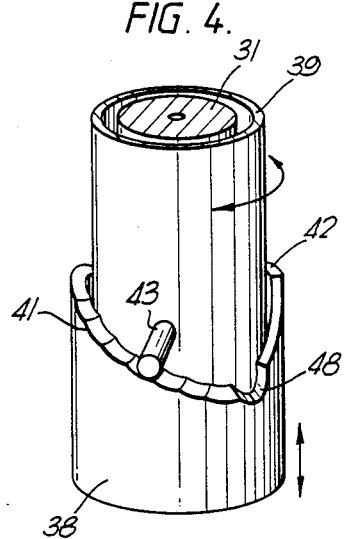
FIG. 4 is an enlarged view of another part of the control valve system.
Figure 5:
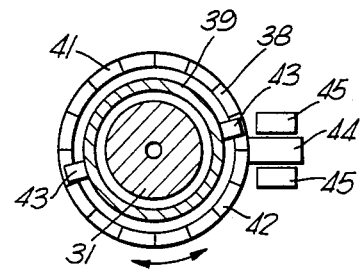
FIG. 5 is a plan view of the part shown in FIG. 4.
Figure 7:
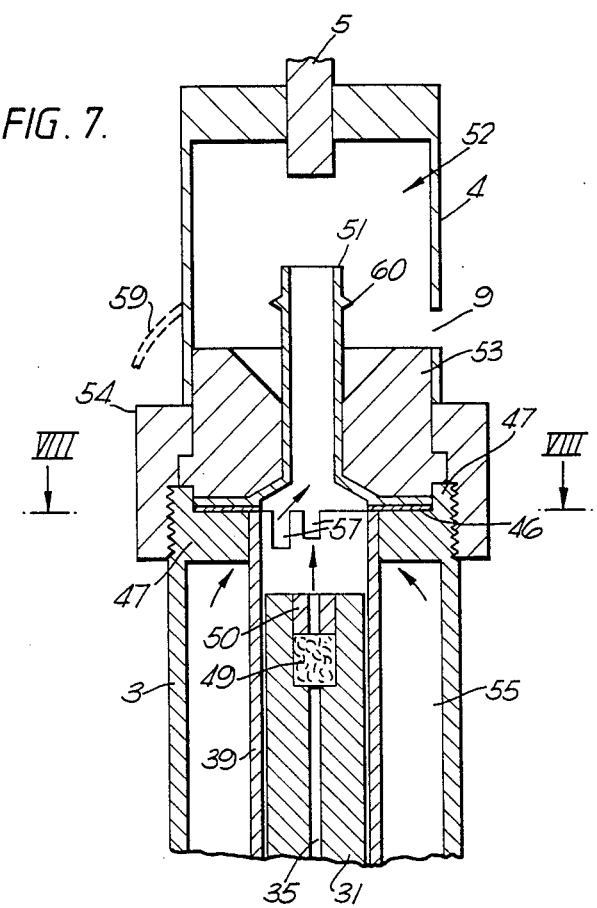
FIG. 7 is a section through another part of the soldering iron showing the air admission means and the combustion chamber.

As shown more clearly in FIGS. 4 and 5, the cam member 30 has a pair of symmetrically arranged inclined cam surfaces 41 and 42 on which are engaged a pair of cam follower pins 43 projecting radially from the control tube 39. The cam member 38 is prevented from rotation by means of a radial extension 44 extending between two guides 45. The control tube 39 extends up the boldering iron and, as shown in FIG. 7 is restricted against longitudinal movement at its far end by a washer 46. At this upper end the tube is mounted for rotation by a bearing formed by two shoes 47 extending inwardly from the outer casing 3, as shown more clearly in FIG. 8.

Thus, movement of lever 6 causes control tube 39 to rotate. As a result the cam follower pins 43 ride up the cam surfaces 41 and 42 of cam member 38 on rotation of the control tube in the clockwise direction in the arrangement shown in FIG. 4. Since cam member 38 cannot rotate, it is moved downwards as shown in FIG. 4. This causes it to act on the valve operating member 31 and diaphragm 30, through spring 37, increasing the opening force for the gas container valve, i.e., the force on head 32 of extension 28, acting against the closing force of spring 21. This in turn increases the flow of gas from the container.

In the arrangement shown, the cam surfaces 41 and 42 are not linear but provided with a series of steps. Furthermore, there are pronounced notches 48 representing the off positions, i.e. the positions at which the gas container valve is not open. In this condition, the end of the valve operating member 31 is spaced from the head 32 of the extension 28 of stem 13 in the gas container.

The spring 37 is prestressed so that control movement is not wasted in compressing the spring to the point at which the gas container valve opens. Prestressing can also give a sharply defined line between off and on. A further advantage of prestressing the spring is to enable various rates for the spring to be held between the same mechanical limits, i.e. a long soft spring held between the same mechanical limits would create a gradual slope to the gas flow. This in combination with varying profiles for the cam surfaces 41 and 42 can permit a wide range of flexibility between the same mechanical limits.

When the control lever 6 is turned to the on condition the extra pressure on the spring 21 pushes the operating member assembly against the head 32. The gas valve is thus caused to open allowing gas to pass into the chamber 29 behind the diaphragm 30. The diaphragm 30 pushes directly on the operating member 31 via the flange 33 when the gas pressure reaches a determined level so that the member 31 is forced to move away from the head 32 allowing the gas valve to shut. As gas is consumed in the combustion head 4, this tends to lower the pressure in the chamber cavity 29 behind the diaphragm 30. When the pressure drops sufficiently the gas valve 13 is caused to open replenishing the gas supply to the chamber 29 behind the diaphragm and achieving a state of balance for any one setting of the control lever 6.

A typical control average supply pressure up the bore 35 to head 4 would be 28 kPa compared with 112 kPa in the gas container. The regulation is desirable to ensure correct air gas mixtures which should be independent of any changes of pressure in the fuel tank due to changes of ambient pressure.

Figure 6:
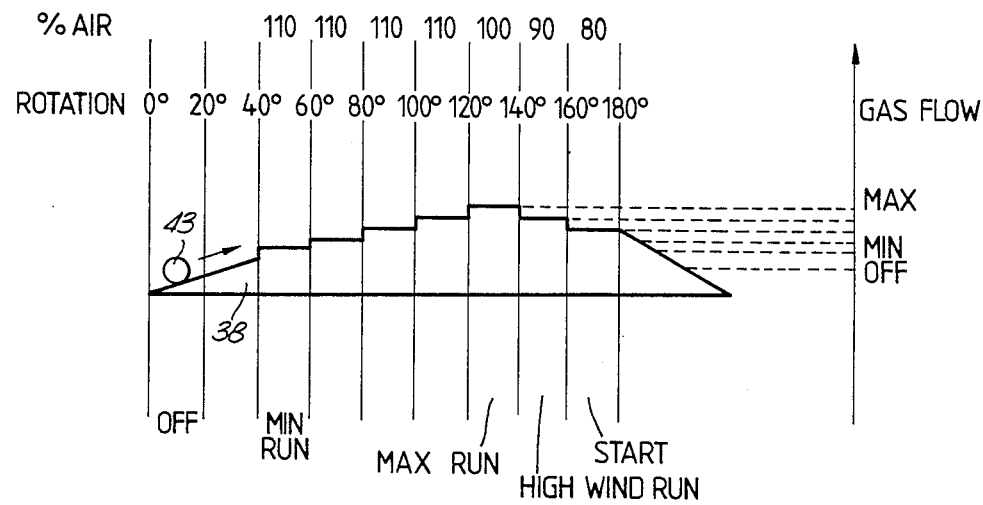
FIG. 6 is a diagram showing the profile of a cam which could be used in the control valve system.

As will be appreciated the cam profile will determine the axial displacement of the cam member 38 and operating member 31. The profile need not increase continuously through a cycle of rotation (180° C. in the example given) but could have decreasing portions. Reference is made to FIG. 6 which shows diagramatically a suitable profile which could be used. Initially, there are increasing steps as the control lever 6 is rotated, but for the last 40° the axial displacement decreases in two steps. The efects of this particular profile will be discussed in more detail below. As will be seen in FIG. 6, the air/gas ratio also varies as the control lever 6 is rotated, and the manner of achieving this will now be described in conjunction with the construction of the combustion head.

Figure 8:
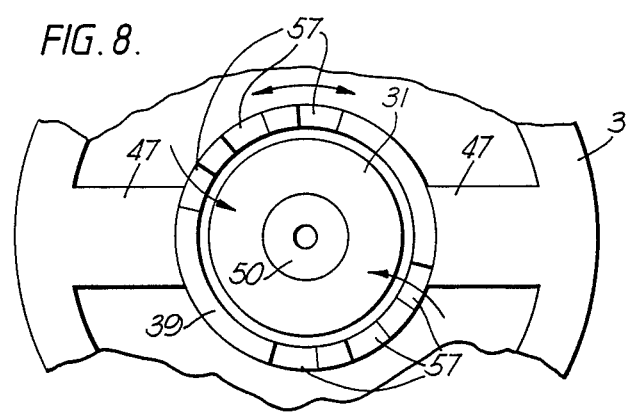
FIG. 8 is a partial top view on the lines VIII—VIII of FIG. 7.

Turning now to FIGS. 7 and 8, the upper end of operating member 31 which includes the gas supply bore 35, is provided with a filter 49 and a jet 50 which directs gas into a bunsen type of tube 51, at the end of which the gas is to burn in chamber 52 of the metallic combustion head 4. The tube 51 is mounted in a ceramic member 53 and the metallic assembly is secured to outer casing 3 by a threaded member. 54.

Air is admitted to an annular space 55 between the outer casing 3 and control tube 39 by means of an aperture 56 at the base of the casing as shown in FIG. 2. Because the upper end of the control tube 39 bears against washer 46, air cannot flow freely into the tube unless it is provided with apertures. Thus, castellations are provided around the upper end of the tube, and these define apertures 57. As the control tube rotates, selected apertures or parts of apertures are blocked by the shoes 47 to vary the quantity of air which can be admitted. The apertures can be of different sizes and shapes, so as to provide versatility of adjustment. Thus, increasing rotation of the control tube 39 does not have to result in a steady increase or decrease of the air admitted. This is particularly advantageous in the context of the gas flow control which can provide specific settings. Combined with the control of air flow, a programme can be set up to provide a number of specific combinations.

Thus, referring again to FIG. 6, it will be seen that for gas flow, as the control lever 6 and thus tube 39 are rotated, there is an off position, and five increasing steps for increasing output. Over the first four steps, the air ratio stays constant at 110%, but at maximum run there is a reduction to 100% air. There is then a position for high wind use at which the gas flow is below that for normal maximum running, but the mixture is richened by reducing the air ratio to 90%. Finally, there is a start position, with a lower gas flow still (but above minimum) and a richer mixture using 80% air.

It will thus be seen how operating a single control, lever 6, adjusts the gas flow and mixture strength in accordance with a desired programme.

The elongate control tube 39 also allows for versatility of design, and it would for example be possible to provide a control such as an edge wheel, at the upper end of outer casing 3 instead of lever 6. Although the gas flow valve and air admission system are at opposite ends of the soldering iron, the control tube enables both to be adjusted together.

As noted earlier, the soldering iron is provided with a piezo electric ignition device 8. As indicated diagramatically in FIG. 2, one lead 58 from this is connected to the control tube 39, which is metallic. The other lead 59 is connected to metallic combustion head 4. Washer 46 and burner tube 51 are also metallic and thus operation of the piezo electric device 8 causes a spark to jump between head 4 and protrusions 60 on burner tube 51.

The soldering iron also includes as safety shut off valve in the event that the differentcial value fails due to e.g. failure of the diaphragm. The normal use, movement of the operating member 31 downwards as shown in FIG. 3, causes the aperture 12 to be opened. However, if the diaphragm 12 fails, for example, the restraining force against movement of the operably member 31 will be reduced significantly. This will cause the member 31 to move further than normal. This is used to advantage, by forming the downstream side of member 10 as a second valve seat 61 and providing the underneath of head 32 with a seal 62. Thus, this excessive movement causes the aperture 12 to be sealed on the downstream side.

Figure 9:
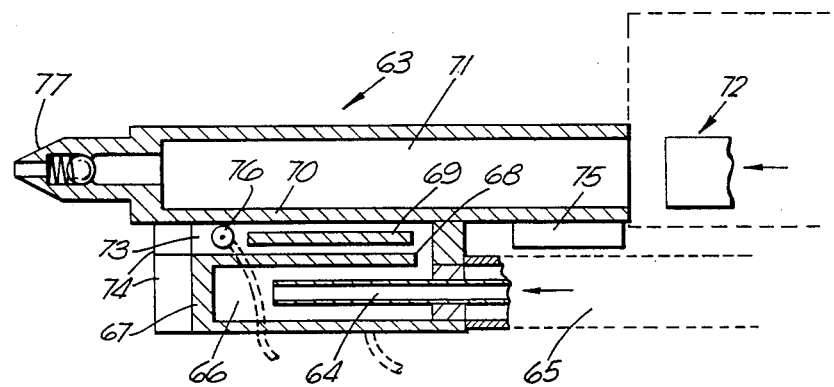
FIG. 9 is a side sectional view of a head for use with a glue gun.
Figure 10:
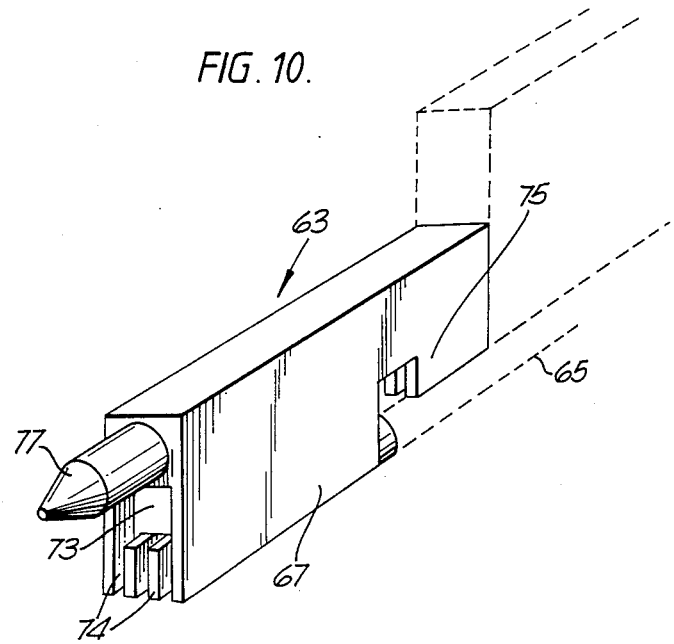
FIG. 10 is a perspective view of the head of FIG. 9.

Turning now to FIGS. 9 and 10, there is shown an alternative combustion head for use with a hot melt glue gun. The head 63 is fed by a gas air mixture via a bunsen tibe 64 from a controlled gas air source indicated generally at 65, which functionally is as described in relation to the soldering iron above. The combustion chamber indicated at 66 is buried deep inside the body of a monoblock casting indicated at 67. The combustion chamber 66 is in the form of a labyrinth with walls 68 and a baffle 69.

The hot exhaust gases from combustion heat the thin wall 70 of a glue feed passageway 71 over approximately ⅔ of its length, the passageway being part of a glue gun indicated at 72. The walls 68 and bafle 69 reduce the temperature of the exhaust gases leaving the monoblock casting. The combustion chamber rises in temperature above that needed to melt the glue, typically by 100° C. If this high temperature was applied directly to the glue passageway hot spots would cause the glue to chemically dissociate. The system enables an even grandient of heat along the glue passageway to be achieved. This is done by spacing away the combustion chamber and spreading the heat by the integration of the exhaust gas and direct heat conduction through the walls of the monoblock.

An exhaust outlet 73 is provided with cooling fins 74, and the rear of passageway wall 70 is provided with cooling fins 75.

Ignition can be achieved by applying a naked flame to the end of the exhaust passageway 73, or by an electrical spark inside the exhaust passage created by an electrode indicated at 76. The insulator which houses the electrode is positioned along the exhaust passageway in a position that gives the best result, typically ⅓ from the exit end. A cap or cover may be placed over the front of the exhaust 73 to prevent direct draught.

The monoblock may be housed in a high temperature case i.e. glass loaded nylon. The front area, i.e. the glue nozzle indicated at 77, may be left outside the confines of the case hence ducting away exhaust gases to the atmosphere, together with combustible gases on start up, preventing fire or explosion inside the case.

It will be appreciated that there are many possible variations to the broad principles and specific features referred to above, and that these may be used together or in combination as required in accordance with the particular apparatus concerned and the advantages it is wished to obtain.

Attention is also directed to the generally advantageous construction of e.g. the soldering iron disclosed. Apart from its compact construction with "in-line" components and members acting along a central axis, it has other features. For example, the gas valve operating member or jet tube is not screwed in place but simply pressed through the diaphragm. This enables simple assembly and disassembly. The container can be made separable readily from the remainder of the iron, taking with it the diaphragm and leaving behind the control tube, cam and jet tube, any or all of which can be replaced easily. In such an arrangement, the outer casing of the iron would be detachably connected to the main body of the iron.

What is claimed:

1. A gas heated tool comprising a container of pressurised gas; a differential valve for regulating the flow of gas from the container to a jet, the differential valve including a movable diaphragm; means for adjusting a biassing force on the diaphragm so as to adjust the regulated pressure at which the gas is supplied; air admission means through which air is drawn to mix with the gas from the jet; a conduit for feeding the gas/air mixture to an enclosed combustion chamber having means for allowing the exit of exhaust gas; and means for adjusting the air admission means to vary the gas/air ratio of the mixture; characterised in that control means are provided which simultaneously control the adjustment of the biassing force on the diaphragm and the adjustment of the air admission means so as to provide a plurality of predetermined combinations of gas flow and associated gas/air ratios, including a starting condition at which there is a relatively high gas flow and a relatively rich mixture, and at least one running condition at which there is a lower gas flow and a leaner mixture.

2. A tool as claimed in claim 1 characterised in that said relatively rich mixture for said starting condition is a gas rich mixture and said leaner mixture for said at least one running condition is an aerated mixture.

3. A gas burning appliance comprising a container of pressurized gas and a differential valve for controlling the flow of gas from the container, in which the valve comprises an apertured member providing an outlet for gas from the container, a chamber on the downstream side of the outlet, a movable diaphragm forming a wall of the chamber, a conduit for the supply of gas from the chamber, a valve operating member arranged for movement with the diaphragm, a valve closure member biassed to the closed position on the upstream side of the outlet by a resilient means, the valve operating member being movable axially in a direction to move the valve closure member to an open position, and control means for exerting a biassing force on the diaphragm and valve operating member in the valve opening direction, characterised in that secondary sealing means are arranged to close the outlet on the downstream side thereof upon continued movement of the valve operating member, in the same direction, beyond the position at which the valve closure member is in the open condition on the upstream side of the outlet.

4. A gas burning appliance having a refillable container of pressurised gas, the container including a gas outlet valve and a gas inlet valve for refilling purposes, the inlet and outlet valves being biassed to the closed position, characterised in that means are operatively connected between the inlet and outlet valve whereby upon opening of the inlet valve for refilling purposes an additional closing force is transmitted to the outlet valve.

5. A gas container for use with a gas burning appliance, the container having a valve to be controlled in use by a valve operating member provided for the appliance, said container comprising an apertured member providing an outlet for gas from the container, and a valve closure member biassed to a closed position on the upstream side of the outlet by a resilient means so that in use axial movement of the valve operating member causes the valve closure member to move against the biassing force to permit the flow of gas from the container, characterized in that a connecting member is joined to the valve closure member and extends through the outlet, and a second valve closure member is joined to the connecting member on the downstream side of the outlet, whereby in use continued axial movement of the valve operating member causes the second valve closure member to close the outlet on the downstream side.

6. A tool as claimed in 1 characterised in that there is a predetermined high run condition with a maximum gas flow and with a mixture intermediate said relatively rich and said leaner mixtures.

7. A tool as claimed in claim 6 characterised in that in the starting condition the gas flow is less than said maximum flow.

8. A tool as claimed in claim 7 characterised in that there is a predetermined high wind operation condition in which both the gas flow and the gas/air mixture are intermediate those for the high run and starting conditions.

9. A tool as claimed in claim 1 characterised in that there is a plurality of predetermined running conditions in which the gas flows are different but the gas/air mixtures are the same.

10. A tool as claimed in claim 1 characterised in that the control means includes a cam and cam follower arrangement, the profile of the cam at least in part determining the relationship between the degree of adjustment of the biasing force on the diaphragm and the degree of adjustment of the air admission means.

11. A tool as claimed in claim 10 characterised in that the control means includes a rotatable control member whose angular position adjusts the flow cross-section of the air admission means, one of the cam and cam follower being arranged for rotation with the control member, and the other being axially movable to adjust the biasing force on the diaphragm.

12. A tool as claimed in claim 1 characterised in that said differential valve comprises an apertured member providing an outlet for gas from the container of pressurised gas, a chamber on the downstream side of the outlet, said movable diaphragm forming a wall of the chamber, a conduit for the supply of gas from the chamber to the jet, a valve operating member arranged for movement with the diaphragm, a valve closure member biassed to the closed position on the upstream side of the outlet, the valve operating member being movable axially in a direction to move the valve closure member to an open position, said biasing force acting on the diaphragm and valve operating member in the valve opening direction, and secondary sealing means arranged to close the outlet on the downstream side thereof upon continued movement of the valve operating member, in the same direction, beyond the position at which the valve closure member is in the open condition on the upstream side of the outlet.

13. A tool as claimed in claim 1 characterised in that the gas container is refillable and comprises an outlet valve at one end thereof biassed by means within the container to a closed position, and a gas inlet valve at the other end thereof for refilling purposes and biassed by means within the container to a closed position, wherein the gas inlet and gas outlet valves are disposed opposite each other and interconnected by spring means providing the respective biassing forces, so that a force tending to open the inlet valve for refilling purposes is transmitted as an additional closing force to the outlet valve.

14. A tool as claimed in claim 1 characterised in that it is in the form of a soldering iron.

15. A gas burning appliance comprising a mixture supplying conduit for feeding gas/air mixture to a combustion region, a jet for introducing pressurised fuel gas into the conduit, a gas flow valve for varying the flow of gas from the jet, air admission means of variable flow cross-section through which air is drawn into the conduit to mix the gas, and control means for simultaneously adjusting the gas flow valve and adjusting the air admission means, characterised in that the control means includes a cam and cam follower arrangement operatively connected between the gas flow valve and the air admission means, the cam having a profile which at least in part determines the relationship between the degree of adjustment of the gas flow valve and the degree of adjustment of the air admission means so as to provide gas/air mixtures and gas flow rates.

16. An appliance as claimed in claim 15 characterised in that the control means includes a rotatable control member whose angular position adjusts the flow cross-section of the air admission means, one of the cam and cam follower being arranged for rotation with the control member, and the other being axially movable with a gas valve operating member in accordance with rotation of the control member.

17. An appliance as claimed in claim 15 characterised in that the gas flow valve is a differential valve having a movable diaphragm and the control means is operative to adjust a biassing force on the diaphragm.

18. An appliance as claimed in claim 15 characterised in that the cam is provided with a plurality of steps on its profile representing predetermined positions of adjustment.

19. An appliance as claimed in claim 4, characterised in that the inlet and outlet valves are disposed opposite each other and the means operatively connected between them comprises spring means providing the force biasing the valves to the closed position.

20. An appliance as claimed in claim 4 characterised in that the inlet valve is openable by engagement with filling means.

21. An appliance as claimed in claim 4 characterised in that the outlet valve forms part of a differential gas valve comprising an apertured member providing an outlet for gas from the container, a chamber on the downstream side of the outlet, a movable diaphragm forming a wall of the chamber, a conduit for the supply of gas from the chamber, a valve operating member arranged for movement with the diaphragm, said outlet valve of the container being in the form of a closure member biased to the closed position on the upstream side of the outlet, the valve operating member being movable axially in a direction to move the valve closure member to an open position, and control means for exerting a biassing force on the diaphragm and valve operating member in the valve opening direction, wherein secondary sealing means are arranged to close the outlet on the downstream side thereof upon continued movement of the valve operating member, in the same direction beyond the position at which the valve closure member is in the open condition on the upstream side of the outlet.

22. A refillable gas container for use with a gas burning appliance, comprising an outlet valve at one end thereof biassed by means within the container to a closed position, and gas inlet valve at the other end thereof for refilling purposes and biassed by means within the container to a closed position, the inlet valve being openable by engagement with refilling means, characterised in that the gas inlet and gas outlet valves are disposed opposite each other and interconnected by spring means providing the respective biassing forcers, so that a force tending to open the inlet valve for refilling purposes is transmitted as an additional closing force to the outlet valve.

23. A gas container as claimed in claim 5 characterised in that it is refillable and includes a gas inlet valve opposite the valve closure member, and biasing means acting between the inlet valve and valve closure member so as to provide a closing force on both.

24. A gas container as claimed in claim 23 characterised in that the inlet valve is openable by engagement with refilling means urged in a direction against the action of the biassing means.

25. A gas container as claimed in claim 5 characterised in the that there is a chamber on the downstream side of the outlet from the container, having a wall formed by a movable diaphragm which is adapted to be connected to and move with the valve operating member of the gas burning appliance, so as to form a differential valve.

26. A differential gas valve for use with a gas burning appliance, comprising an apertured member providing an outlet for gas from a source of pressurised gas, a chamber on the downstream side of the outlet, a movable diaphragm forming a wall of the chamber, a conduit for the supply of gas from the chamber, a valve operating member arranged for movement with the diaphragm, a valve closure member biassed to the closed position on the upstream side of the outlet, the valve operating member being movable axially in a direction to move the valve closure axially in a direction to move the valve closure member to an open position, and control means for exerting a biassing force on the diaphragm and valve operating member in the valve opening direction, characterised in that secondary sealing means are arranged to close the outlet on the downstream side thereof upon continued movement of the valve operating member, in the same direction, beyond the position at which the valve closure member is in the open condition on the upstream side of the outlet.

27. A gas heated tool comprising a container of pressurised gas; a differential valve for regulating the flow of gas from the container to a jet, the differential valve including a movable diaphragm; means for adjusting a biassing force on the diaphragm so as to adjust the regulated presure at which the gas is supplied; air admission means through which air is drawn to mix with the gas from the jet; a conduit for feeding the gas-air mixture to a combustion region; means for adjusting the air admission means to vary the gas-air ratio of the mixture; and control means which simultaneously control the adjustment of the biassing force on the diaphragm and the adjustment of the air admission means so as to provide a plurality of predetermined combinations of gas flow and associated gas-air ratios.

28. A tool as claimed in claim 10, characterised in that the cam is provided with a plurality of steps on its profile representing predetermined positions of adjustment.

* * * * *